(12) United States Patent
Van Slyke et al.

(10) Patent No.: US 10,208,540 B2
(45) Date of Patent: Feb. 19, 2019

(54) NON-TOXIC, INEXPENSIVE, LOW VISCOSITY MINERAL OIL BASED DRILLING FLUID

(71) Applicant: Chevron U.S.A. Inc., San Ramon, CA (US)

(72) Inventors: Donald C. Van Slyke, Richmond, TX (US); Christopher E. Johnson, Martinez, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 526 days.

(21) Appl. No.: 14/875,264

(22) Filed: Oct. 5, 2015

(65) Prior Publication Data

US 2016/0122612 A1 May 5, 2016

Related U.S. Application Data

(60) Provisional application No. 62/072,885, filed on Oct. 30, 2014.

(51) Int. Cl.
*C09K 8/035* (2006.01)
*E21B 7/00* (2006.01)
*C09K 8/32* (2006.01)

(52) U.S. Cl.
CPC . *E21B 7/00* (2013.01); *C09K 8/32* (2013.01)

(58) Field of Classification Search
None
See application file for complete search history.

(56) References Cited

U.S. PATENT DOCUMENTS

| 5,635,457 | A | 6/1997 | Van Slyke | |
| 6,887,832 | B2 * | 5/2005 | Kirsner | C09K 8/32 |
| | | | | 507/103 |
| 7,071,150 | B2 * | 7/2006 | Genuyt | C09K 8/34 |
| | | | | 507/103 |
| 2003/0036484 | A1 * | 2/2003 | Kirsner | C09K 8/34 |
| | | | | 507/118 |
| 2005/0197256 | A1 * | 9/2005 | Dunlop | C09K 8/34 |
| | | | | 507/103 |
| 2010/0298176 | A1 * | 11/2010 | Maker | C09K 8/32 |
| | | | | 507/138 |

OTHER PUBLICATIONS

D.C. Van Slyke, Non-toxic, inexpensive synthetic drilling fluid; *Journal of Cleaner Production*, vol. 5, No. 4, Apr. 1, 1997, pp. 318-318.

* cited by examiner

*Primary Examiner* — John J Figueroa
(74) *Attorney, Agent, or Firm* — King & Spalding LLP

(57) ABSTRACT

The disclosure relates to drilling fluid compositions, and their method of use, comprising a non-toxic and low cost-to-produce mineral base oil comprising 90 to 100% branched and cyclic-paraffins and virtually aromatic free. The disclosed base oils are suitable to replace diesel oil and distillates in any drilling operation and offers a reduced environmental impact and improved health and safety of employees.

21 Claims, 1 Drawing Sheet

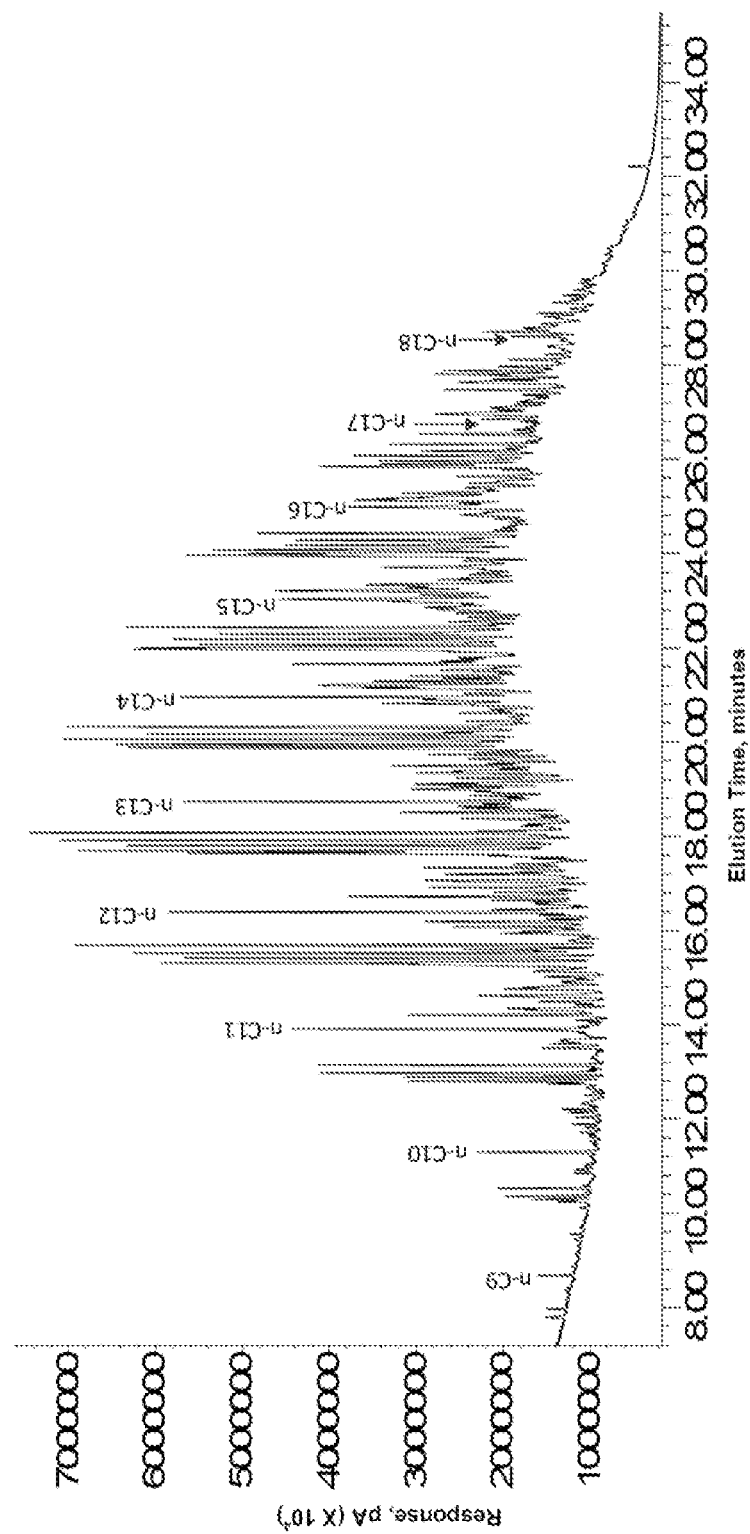

NON-TOXIC, INEXPENSIVE, LOW VISCOSITY MINERAL OIL BASED DRILLING FLUID

CROSS REFERENCE TO RELATED APPLICATIONS

The present non-provisional patent application claims priority under 35 U.S.C. 119(e) to U.S. Provisional Application No. 62/072,885 filed Oct. 30, 2014, and titled "Non-Toxic, Inexpensive, Low Viscosity Mineral Oil Based Drilling Fluid," the entire contents of which is incorporated herein by reference.

FIELD OF THE INVENTION

The disclosure generally relates to drilling fluids formulated with non-toxic and relatively low cost-to-produce mineral base oils comprising 90 to 100% branched and cyclic-paraffins and virtually aromatic free, and their methods of use. The disclosed base oils are suitable to replace diesel oil and distillates in any drilling operation and provide improved viscosity and reduced pollution.

BACKGROUND

In rotary drilling wells (e.g., oil, gas, geothermal wells and the like), a drilling fluid is typically pumped downwardly through a string of hollow drill pipe to, and outwardly through, a drill bit connected at the bottom end of the drill pipe string. The drilling fluid—commonly referred to as a drilling "mud"—is circulated, by injection-pump pressure, back upwardly from the bottom of the drill pipe string, through the annular space formed between the drill pipe and the surrounding well bore and/or casing, to thereby transport drilled cuttings and other well debris out of the borehole.

The following important functions are served by the drilling fluid, or mud: to clean the bit and bottom of the borehole so that the bit can drill; remove and transport drilled cuttings to the surface; cool and lubricate the bit and drill string; maintain pressure balance between the geological formations and the wellbore thereby preventing the loss of well control (blowouts) and mitigating the caving in of the borehole in weak formation regions; seal porous formations; and provide, with routine testing of the mud, information about the formation penetrated. Various materials are added to prepare and condition drilling muds.

The term "mud" applied to drilling fluids contrasts with the fact that drilling fluids are typically quite complex, specially-formulated fluids which play an important, if not critical, role in rotary well drilling operations, especially those in which deep oil or gas wells are being drilled. Drilling muds are, as an illustration, usually formulated to have: (i) a comparatively low viscosity at all temperatures normally encountered, from the surface to the bottom of the borehole, so as to minimize lost circulation problems and costs; (ii) a sufficient density and rheological characteristic to keep drilled cuttings in suspension, to thereby prevent settling of the entrained cuttings in the borehole; and (iii) a relatively high flash point so as to reduce the risk of fires and explosions which might otherwise be caused by use of the drilling mud.

Typically, the base fluids selected for drilling muds are water or oil. Oil base drilling fluids provide many advantages over water base drilling fluids because of their excellent shale inhibition, high penetration rate, temperature stability, and lubricating characteristics. They are typically based on mineral oils containing aromatics, diesel oil, distillates or synthetic oils with the addition of additives therein to effect an emulsion in which the oil provides a continuous phase, e.g., a water in oil invert emulsion drilling fluid. However, the human health risks and environmental pollution caused by the use of diesel, distillates and some mineral oils have become increasingly objectionable because the oils tend to come into contact with workers and escape into the environment, contaminating both the land and the water. This has led to the imposition of strict regulations for the protection of workers and the environment. Spent drilling fluids and drilled cuttings are thus among the most significant waste streams from oil and gas exploration and production operations, and pose a serious and costly disposal problem for onshore and offshore operators. For example, offshore operators must barge spent mud and cuttings to shore for land disposal if the materials do not meet EPA discharge limitations or permit requirements. Due to problems of toxicity and persistence which are associated with these oils, considerable effort and expense has been made by the industry to develop alternatives to such aromatic-containing oils in drilling muds. More recently, highly refined relatively low aromatic mineral oils have been used as the oil phase of drilling fluids. These are of much lower toxicity, but are much more expensive than diesel fuel and distillates and are produced from petroleum feedstocks by a variety of processes which reduce the concentration of aromatics and especially polynuclear aromatics.

There exists a need for less expensive non-aqueous drilling fluid alternatives, particularly those that decrease the health and safety risks posed to employees and the environment and that retain or improve on the rheological characteristics of the more conventional oil base drilling fluids, e.g., diesel oil.

SUMMARY OF THE INVENTION

The disclosure generally relates to a non-toxic, low cost-to-produce and virtually aromatic free mineral oil-based drilling fluid and their methods of use. Embodiments of the disclosed drilling fluids are formulated from a non-toxic mineral base oil comprising 30-55 wt % branched paraffin compounds; 45-65 wt % cyclic paraffin compounds; 0.1 wt % or less aromatic compounds; and 0.005 wt % or less polynuclear aromatic compounds, wherein the combined amount of branched paraffin compounds and cyclic paraffin compounds having between 10 and 19 carbon atoms is 90-100 wt % of the base oil.

In alternative embodiments, the mineral base oil comprises 32-52 wt % branched paraffin compounds; 50-60 wt % cyclic paraffin compounds; 0.05 wt % or less aromatic compounds; and 0.001 wt % or less polynuclear aromatic compounds, wherein the combined amount of branched paraffin compounds and cyclic paraffin compounds having between 10 and 19 carbon atoms is 95-100 wt % of the base oil.

In additional embodiments, the mineral base oil is characterized by one or more of the following properties: (i) a kinematic viscosity at 40° C. of between about 1 centistoke (cSt) and about 5 cSt; (ii) a flash point of at least 82.2° C. (180° F.); (iii) a pour point of less than about −40° C. (−40° F.); (iv) a cold flow viscosity at a temperature of 0° C. of less than about 7.0 cp; (v) an initial boiling point of greater than 200° C. and a final boiling point of greater than 300° C.; and (vi) wherein 90% of the mixture boils within the range of 220° C. and 310° C.

The drilling fluids of the present invention additionally comprise such additives as water, viscosifiers, emulsifiers, wetting agents, shale inhibiting salts, fluid loss control additives, weighting agents, and combinations thereof.

BRIEF DESCRIPTION OF THE DRAWING

FIG. 1 is a GC/MS "fingerprint" analysis obtained for an embodiment of the disclosed mineral base oil and characterizes the distribution of paraffins (n-paraffins, iso-paraffins, and cycloparaffins) according to carbon number.

DETAILED DESCRIPTION

Definitions and Terms

The term "branched paraffins" is used herein to refer to saturated hydrocarbons having branched carbon backbones with the general formula $C_nH_{2n+2}$. Branched paraffins is a term often synonymous with isoalkanes or isoparaffins.

The terms "cyclic paraffins" or "naphthenes" is used herein to refer to saturated hydrocarbons that contain one or more rings.

The term "n-paraffins" refers to straight-chain, saturated hydrocarbons also known as "normal paraffins."

The phrase "drilling fluid" is used herein to refer to liquid fluids, fluid mixtures and mixtures of fluids and solids (as solid suspensions, mixtures and emulsions of liquids, gases and solids) used in operations to drill boreholes into the earth.

The phrase "base oil" or "base fluid" generally refers to hydrocarbon oil or oils that form the continuous phase of the drilling fluid into which other additives are mixed.

The phrase "pour point" refers to the lowest temperature at which a fluid will pour or flow. (See, e.g., ASTM International Standard Test Method D97). The results are reported in degrees Celsius. Many commercial base oils have specifications for pour point. When base oils have low pour points, the base oils are also likely to have other good low temperature properties, such as low cloud point, and low cold flow viscosity.

The phrase "viscosity" refers to a measurement of the resistance to the flow of a fluid. Many base oils, drilling fluid compositions made from them, and the correct operation of equipment depends upon the appropriate viscosity of the fluid being used. Kinematic viscosity is determined by ASTM D445-06. The results are reported in $mm^2/s$ or centistoke. The term "centistoke," abbreviated "cSt," is a unit for kinematic viscosity of a fluid (e.g., a drilling fluid), wherein 1 centistoke equals 1 millimeter squared per second (1 cSt=1 $mm^2/s$). It is also the ratio of the dynamic viscosity of a fluid to the fluid density. See, e.g., ASTM Standard Guide and Test Methods D 2270-04, D 445-06, D 6074, and D 2983. Cold flow viscosity is a property that describes the resistance to the flow of a fluid at low temperature as determined by ASTM D 7042.

The phrase "flash point" as used herein refers to one measure of the tendency of the material to form a flammable mixture with air under controlled laboratory conditions as determined by, e.g., ASTM D 93.

The non-toxic base oils considered to be the most suitable base oils for use in the drilling fluid of the present invention, and in particular, as replacements for any application that currently employs mineral oil containing aromatics, diesel oil, and distillates are what are sometimes termed "enhanced mineral oils." This term is generally applied to saturated hydrocarbon substances typically obtained as a distillate of petroleum.

Diesel and distillates are widely used in drilling operations. The viscosity of diesel used in drilling is between 3.5 and 4.2 cSt at 40° C., which is considerably higher than the kinematic viscosity of the presently described mineral oils.

A principal reason for selecting the presently disclosed mineral oils as base oils for the drilling fluid of the present invention is that they not only have the needed physical characteristics (including low viscosity, high flash point, etc.) but the constituent paraffins are widely recognized as being non-toxic. As abovementioned, strict environmental regulations can be expected to increasingly limit the use of aromatic-containing petroleum base oils, such as conventional mineral oils, diesel and distillate oils, most of which are considered to be at least somewhat toxic.

Unless otherwise indicated herein, scientific and technical terms used in connection with the present invention shall have the meanings that are commonly understood by those of ordinary skill in the art. Further, unless otherwise required by context, singular terms shall include pluralities and plural terms shall include the singular. More specifically, as used in this specification and the appended claims, the singular forms "a," "an" and "the" include plural references unless the context clearly dictates otherwise. Thus, for example, reference to "a drilling fluid additive" includes a plurality of drilling fluid additives, and the like. In addition, ranges provided in the specification and appended claims include both end points and all points between the end points. Therefore, a range of 2.0 to 3.0 includes 2.0, 3.0 and all points between 2.0 and 3.0, such as 2.1, 2.5 and 3.7. Furthermore, all numbers expressing quantities, percentages or proportions, and other numerical values used in the specification and claims, are to be understood as being modified in all instances by the term "about". As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Drilling Fluid Compositions

The disclosure relates to drilling fluid compositions useful in operations for the production of oil and gas, the drilling fluid formulated from a non-toxic mineral base oil comprising 90 to 100% branched and cyclic paraffin compounds that have between 10 and 19 carbon atoms, and less than 0.1 wt % aromatics. Embodiments of the described mineral base oil are independently characterized by any one, or any combination of, the following compound concentration ranges: total branched and cyclic paraffin, total branched paraffin, C12-C17 branched isoparaffin, total cyclic paraffin, C14-C19 cyclic paraffin, total n-paraffin, total aromatic, and polynuclear aromatic set forth in the following Table 1. The listed percentages are with respect to the total weight of the mineral base oil.

TABLE 1

| Total branched and cyclic paraffins | Total branched paraffins | C12-C17 branched paraffins | Total cyclic paraffins | C14-C19 cyclic paraffins | Total n-paraffins | Total aromatics | polynuclear aromatics |
|---|---|---|---|---|---|---|---|
| 90-100% | 30-55% | 31-43% | 45-65% | 44-55% | ≤4% | ≤0.1% | ≤0.01% |
| 95-100% | 32-52% | 33-41% | 50-60% | 46-53% | ≤3% | ≤0.01% | ≤0.005% |
| 97-100% | 38-45% | 35-39% | 53-57% | 48-51% | ≤2.5 | ≤0.005% | ≤0.001% |

In a particular embodiment, the mineral base oil is characterized by having a kinematic viscosity at 40° C. (as measured by ASTM D 445) that is typically between about 1 centistoke (cSt) and about 5 cSt, less than about 5 cSt, less than about 4 cSt, or less than 3 cST.

In a particular embodiment, the mineral base oil is characterized by having a flash point (as measured by ASTM D 93) that is typically at least about 82° C. (180° F.), at least about 87.8° C. (190° F.), at least about 90.0° C. (194° F.), or at least about 92° C. (198° F.).

In a particular embodiment, the mineral base oil is characterized by having a pour point (as determined by ASTM D 97) that is typically less than about −40° C. (−40° F.), less than about −50° C. (−58° F.), or less than about −55° C. (−67° F.).

In a particular embodiment, the mineral base oil is characterized by having a cold flow viscosity at a temperature of 0° C. (as determined by ASTM D 7042) that is typically less than about 9.0 cp, less than about 7.5 cp or less than about 6.5 cp.

In a particular embodiment, the mineral base oil is characterized by having an initial boiling point of greater than 200° C., 205° C. or 210° C., and a final boiling point of greater than 280° C., 295° C., 300° C. or 305° C. In additional embodiments, at least 90% of the mineral base oil boils within the range of 220° C. and 310° C., within 210° C. and 300° C., or within 215° C. and 295° C.

In a particular embodiment, the mineral base oil is characterized by having a density (as determined by ASTM D 4052) that is typically about 0.78 g/cc or more, about 0.80 g/cc or more, or about 0.82 g/cc or more.

In a particular embodiment, the mineral base oil is characterized by having one or more of the properties described above, including one or more selected from: (i) a kinematic viscosity, at 40° C., less than about 5 cSt, or less than 3 cST; (ii) a flash point of at least about 82° C., at least about 87.8° C.; (iii) a pour point of less than about −40° C., less than about −55° C., or less than about −60° C.; (iv) a cold flow viscosity at a temperature of 0° C. of less than about 9.0 cp or, less than about 6.5 cp; (v) an initial boiling point of greater than 200° C. and a final boiling point of greater than 300° C.; and (vi) wherein at least 90% of the mineral base oil boils within the range of 200° C. and 310° C.

The disclosed non-toxic mineral base oil can be produced as a co-product stream from the dewaxing and hydrofinishing of lubricant base stocks. In certain embodiments, the mineral base oil is obtained by isolating a particular fraction having one or more of the above described properties from the effluent of a combined dewaxing and hydrofinishing reactor process used to produce commercial motor oils described in more detail below. Notably, the lubricant base stock is "dewaxed" by isomerizing the normal paraffins to isoparaffins. Subsequent hydrofinishing of the effluent saturates the aromatics and the olefins compounds to produce a material that has a very low level of normal paraffins and virtually no aromatics or olefins, yet maintains a high yield of desirable products. The reactor effluent is separated into various fractions first via a flash drum, and then by atmospheric distillation. In a traditional lubricants production plant, a vacuum distillation column is used to separate the final finished lubricant according to specifications, with the lighter fraction mineral base oil being directed to the refinery diesel pool since the boiling range of this material is similar to diesel. Traditionally, the physical properties of the mineral base oil would not be controlled to any particular specification due to the limited degrees of freedom in operating the vacuum column to produce the desired finished lubricant product. As such, the boiling range of the mineral base oil can vary dramatically, and it often will exceed the boiling range of diesel fuel, which then requires special handling in a refining operation. For the embodied mineral base oil, an additional separation step takes place between the mineral base oil fraction and the finished lubricant fraction. The internal reflux of the distillation column is controlled between the mineral base oil draw and the finished lubricant draw via total liquid draw tray with only a portion of the liquid removed from the column returned to the column to control the internal reflux. This additional degree of freedom allows for the control of the mineral base oil to the desired specifications, particularly viscosity. This is unique in a lubricants plant, where the emphasis is traditionally on meeting finished lubricant specifications, while recovering the maximum amount of diesel-boiling material that varies significantly in composition. The additional degree of freedom allows for tight control of the diesel-boiling material enabling the production of a non-toxic, low cost-to-produce mineral base oil at a desired viscosity specification to meet drilling performance requirements. The desired fraction is generally 90 to 100% branched and cyclic-paraffins, virtually aromatic free (0.1% or less) and the boiling range for at least 90% of the obtained fraction is between 220° C. and 310° C.

The drilling fluid presently disclosed may contain liquids other than the described mineral base oil, but the base oil preferably comprises at least about thirty percent, preferably at least 50 percent, of the liquid content of the drilling fluid. In this regard, the drilling fluid can either be essentially nonaqueous or can be an emulsion which contains a significant amount of an aqueous component.

In accordance with the present invention, it has been found that this low cost-to-produce mineral base oil co-product of the lubricant production process may be substituted for commonly used oil-based materials, such as diesel oil and distillates, in drilling fluids. It has further been found that the toxicity of the drilling fluid is significantly lowered when compared to drilling muds employing prior base oils such as those derived from crude oil, e.g., fuel oil, conventional mineral, diesel oil and distillates.

Drilling Fluid Additives

Example embodiments described herein are directed to a drilling fluid comprising a base fluid of the foregoing non-toxic mineral base oil and further comprising drilling additives that are well known in the art. The drilling fluid additives are not particularly limited as long as they do not interfere with the desired properties of the embodied drilling fluids. The drilling additives include one or more of the following drilling fluid additives: a solvent suitable for such applications well known in the art, such as water or brine, surfactants (e.g., emulsifiers, wetting agents), viscosifiers, weighting agents, fluid loss control agents, and shale inhibiting salts. Because the drilling fluids according to the disclosed embodiments are intended to be non-toxic, these optional ingredients are preferably also non-toxic. Exemplary emulsifiers include, but are not limited to, fatty acids, soaps of fatty acids, and fatty acid derivatives including amido-amines, polyamides, polyamines, esters (such as sorbitan monoleate polyethoxylate, sorbitan dioleate polyethoxylate), imidazolines, and alcohols.

Typical wetting agents include, but are not limited to, lecithin, fatty acids, crude tall oil, oxidized crude tall oil, organic phosphate esters, modified imidazolines, modified amidoamines, alkyl aromatic sulfates, alkyl aromatic sulfonates, and organic esters of polyhydric alcohols.

Exemplary weighting agents include, but are not limited to barite, iron oxide, gelana, siderite, and calcium carbonate. Typically, the concentration of the weighting agent is 100-700 lbs/bbl.

Common shale inhibiting salts are alkali metal and alkaline-earth metal salts. Calcium chloride and sodium chloride are the preferred shale inhibiting salts.

Common alkalinity and pH-control additives are used to obtain optimal performance from emulsifiers and wettings agents. Divalent ions such as calcium and magnesium enhance the formation of micelles that aid the stabilization of water-in-oil emulsions. Among the most common materials used to control pH are the alkaline earth oxides and hydroxides and alkalis: $Ca(O)$ (quick lime), $Ca(OH)_2$ (hydrated or slakes lime), $Mg(OH)_2$, $NaOH$, $KOH$.

Exemplary viscosifiers include, but are not limited to, organophilic clays (e.g., amine-treated bentonite, amine-treated hectorite, and amine-treated attapulgite), non-organophilic clays (e.g., montmorillonite (bentonite), hectorite, saponite, attapulgite, and illite), oil soluble polymers, polyamide resins, and polycarboxylic acids and soaps. The typical concentration of viscosifiers, e.g., organophilic clay, is 0 to 15 lbs/bbl.

Examples of fluid loss control agents include, but are not limited to, asphaltics (e.g., asphaltenes and sulfonated asphaltenes), amine treated lignite, and gilsonite. The typical concentration of fluid loss control agents is 2 to 20 lbs/bbl. For drilling fluids intended for use in high temperature environments (e.g., where the bottom hole temperature exceeds about 204.4° C. (400° F.), the fluid loss control agent is preferably a polymeric fluid loss control agent. Exemplary polymeric fluid loss control agents include, but are not limited to, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid. Individual or mixtures of polymeric fluid loss control agents can be used in the drilling fluid of this invention. The typical concentration of polymeric fluid loss control agents is 0.05 to 15 lbs/bbl.

Optionally, one or more pour point depressants are employed in the drilling fluids according to the example embodiments disclosed herein to lower their pour point. Typical pour point depressants include, but are not limited to, ethylene copolymers, isobutylane polymers, polyalkylnaphthalenes, wax-aromatic condensation products (e.g., wax-naphthalene condensation products, phenol-wax condensation products), polyalkylphenolesters, polyalkylmethacrylates, polymethacrylates, polyalkylated condensed aromatics, alkylaromatic polymers, iminodiimides, and polyalkylstyrene. (The molecular weights for polyaklylnaphthalenes, polyalkylphenolesters, and polyalkylmethacrylates range from about 2,000 to about 10,000). Because they are non-toxic, ethylene copolymers and isobutylene polymers are the preferred pour point depressants. Up to about 1 weight percent pour point depressant is typically employed.

While not intending to limit the types or amounts of additives that may be appropriate for various drilling operations utilizing the base fluids disclosed herein, a drilling fluid comprising a base fluid according to the present disclosure may further comprise one or more additives selected from the group below:

a) between about 0.5 wt % to about 5.0 wt % of an emulsifier and a wetting agent;
b) between about 0.1 wt % to about 5.0 wt % of an organophilic clay;
c) between about 2.0 wt % to about 30 wt % of water;
d) between about 1.0 wt % to about 10 wt % of a salt;
e) between about 0.1 wt % to about 5.0 wt % of a filtration control agent; and
f) between about 5.0 wt % to about 70 wt % of a weighting agent.

An exemplary drilling fluid composition is shown in Table 2a with suitable concentration ranges for drilling fluids made with the non-toxic mineral base oil according to the presently disclosed embodiments. The ranges disclosed in Table 2a cover drilling fluids with mud weights from 8.6 to 20 ppg and oil-water ratios from 50/50 to 98/2. Table 2b discloses a particular drilling fluid that includes specific amounts within the ranges identified for the additives listed in Table 2a. A person of ordinary skill in the art can readily envisage other ranges and other additives that would be appropriate for practicing the disclosed embodiments of drilling and drilling fluids.

TABLE 2a

Additive Ranges for Invert Emulsion Drilling Fluids
8.6 to 20 lbs/gal Densities, 50/50 to 98/2 Oil-Water Ratios

| Ingredient | Weight % | Volume % |
|---|---|---|
| Mineral base oil | 11.6-66 | 34.4-88.6 |
| Water | 1-39.4 | 1.7-41.8 |
| $CaCl_2$ | 0.5-20.2 | 0.4-9.7 |
| Organoclay | 0.2-1.7 | 0.3-0.9 |
| Fluid Loss Control Additive | 0.6-1.4 | 0.7-0.8 |
| Lime | 0.3-1.6 | 0.1-0.5 |
| Emulsifier | 0.55-2.7 | 0.63-3.2 |
| Wetting Agent | 0-1.4 | 0-2.1 |
| Barite | 2.7-79.8 | 0.7-45.4 |

TABLE 2b

Typical Additive Concentrations for Invert Emulsion Drilling Fluid
12 lbs/gal Density, 80/20 Oil-Water Ratio

| Ingredient | Weight % | Volume % |
|---|---|---|
| Mineral base oil | 32.5 | 60.3 |
| Water | 10.5 | 15.1 |
| $CaCl_2$ | 5.4 | 3.5 |
| Organoclay | 1.2 | 0.9 |
| Fluid Loss Control Additive | 1 | 0.7 |

TABLE 2b-continued

Typical Additive Concentrations for Invert Emulsion Drilling Fluid
12 lbs/gal Density, 80/20 Oil-Water Ratio

| Ingredient | Weight % | Volume % |
|---|---|---|
| Lime | 0.4 | 0.17 |
| Emulsifier | 1.3 | 2 |
| Wetting Agent | 0.5 | 0.8 |
| Barite | 39.2 | 16.5 |

Methods of Using the Example Drilling Fluids

Example embodiments described herein are directed to methods of drilling a wellbore through a formation which are not particularly limited and are well known to those of skill in the art. In an exemplary embodiment the method comprises the steps of: operating a drilling assembly to drill a wellbore and circulating a drilling fluid through the wellbore to bring drill cuttings to the top of the wellbore, wherein the drilling fluid comprises a base fluid comprising the non-toxic mineral base oil described herein.

Embodiments are directed to methods of use of the drilling fluid comprising the non-toxic mineral base oil embodied herein for onshore drilling, shallow water offshore drilling, deep water offshore drilling, pay zone drilling, and drill-in fluid drilling as other examples. The exemplified drilling fluids are particularly useful for plugging back, sand control, perforating, gravel packing, chemical treatment, hydraulic fracturing subterranean formations, packer fluid placement, well killing fluid, spotting fluid, and lubricant in water-based drilling fluid.

EXAMPLES

The following examples are provided to demonstrate particular embodiments of the drilling fluids disclosed herein. It would be appreciated by those of skill in the art that the examples which follow merely represent exemplary embodiments of the drilling fluids disclosed herein. However, those of skill in the art should, in light of the present disclosure, appreciate that many changes can be made in the specific embodiments described and still obtain a like or similar result without departing from the spirit and scope of the drilling fluids disclosed herein.

A sample embodiment as described above was obtained from a lubricant production plant, and submitted for physical properties analyses, the results of which are listed in Table 3 below. Among the advantageous properties that distinguish the embodied mineral base oil over other conventional base oils are ultra-low aromatics, e.g., 0.005% aromatics, polynuclear aromatics, e.g., <0.001%, low viscosity, e.g., 2.57 cSt kinematic viscosity, good cold flow viscosity, e.g., about 6.0 cp cold flow viscosity at a temperature of 0° C., and a high flash point, e.g., 87.7° C. flash point, and a low pour point, e.g., <−60° C. All of these desirable properties are obtained from a material that has a comparable value to diesel. This low cost-to-produce is due to isolating the described mineral base oil fraction having a high cycloparaffin and isoparaffin content from the middle distillate co-product of lubricant production that would otherwise be returned to the diesel pool. The embodied mineral base oil is expected to have good environmental performance based on the results published on other base oils with negligible aromatics and low n-paraffin content, all of which have a higher cost-to-produce than the embodied mineral base oil.

TABLE 3

| Property | Method | Value |
|---|---|---|
| Total Aromatics, wt % | UOP 495 | .005 |
| Polynuclear Aromatics, wt % | EPA 1654 | <.001 |
| Kinematic Viscosity at 40° C., cSt | ASTM D445 | 2.57 |
| Cold Flow Viscosity at 0° C., cP | ASTM D7042 | 6.0 |
| Flash Point, ° F. | ASTM D93 | 190 |
| Pour Point, ° C. | ASTM D97 | <−60 |
| Density, g/cc | ASTM D4052 | .837 |
| Saybolt Color | ASTM D156 | +30 |
| Total Sulfur, wt % | ASTM D5453 | <1 |
| Distillation, ° C. | ASTM D86 | |
| IBP | | 215.9 |
| 5% | | 226.7 |
| 95% | | 301.2 |
| EP | | 308.7 |
| Appearance | ASTM D4176 | Clear, Bright |

A GC/MS PIN analysis is provided below for the same sample described above and characterizes the wt % n-paraffins, iso-paraffins, and cyclo-paraffins according to carbon number. The results of the PIN analysis values are shown in Table 4 below. PIN is commonly known to stand for paraffin, isoprenoid and naphthene. PIN analysis characterizes the relative amounts of n-paraffins, isoparaffins, and cycloparaffins. The calculation of PIN values was performed using a modification of ASTM D2425 Standard Test Method for Hydrocarbon Types in Mass Spectrometry. The corresponding GC/MS fingerprint is shown in FIG. 1.

TABLE 4

| Carbon Number | Hydrocarbon Groups | | | |
|---|---|---|---|---|
| | n-Paraffins | Isoprenoids (Branched) | Naphthenes (Cyclics) | Total PIN |
| 10 | 0.12 | 0.32 | 0.00 | 0.44 |
| 11 | 0.34 | 1.66 | 0.18 | 2.18 |
| 12 | 0.57 | 5.57 | 1.45 | 7.58 |
| 13 | 0.54 | 7.14 | 3.76 | 11.43 |
| 14 | 0.42 | 7.46 | 6.99 | 14.87 |
| 15 | 0.34 | 7.09 | 10.14 | 17.58 |
| 16 | 0.24 | 5.92 | 10.21 | 16.36 |
| 17 | 0.09 | 4.10 | 8.56 | 12.75 |
| 18 | 0.03 | 2.11 | 8.39 | 10.53 |
| 19 | 0.02 | 0.80 | 5.46 | 6.27 |
| Total | 2.70 | 42.17 | 55.13 | 100.00 |
| Units | Normalized Area % of Total Measured Hydrocarbons | | | |

The invention claimed is:

1. A drilling fluid composition useful in the production of oil and gas, formulated with a mineral base oil comprising:
   a) 30-55wt % branched paraffin compounds;
   b) 45-65wt % cyclic paraffin compounds;
   c) 0.1wt % or less aromatic compounds; and
   d) 0.005wt % or less polynuclear aromatic compounds;
   wherein the combined amount of a) branched paraffin compounds and b) cyclic paraffin compounds having between 10 and 19 carbon atoms is 90-100wt % of the base oil.

2. The drilling fluid of claim 1, the non-toxic mineral base oil comprising:
   a) 32-52wt % branched paraffin compounds;
   b) 50-60wt % cyclic paraffin compounds;
   c) 0.01wt % or less aromatic compounds; and
   d) 0.001wt % or less polynuclear aromatic compounds;

wherein the combined amount of a) branched paraffin compounds and b) cyclic paraffin compounds having between 10 and 19 carbon atoms is 95-100wt % of the base oil.

3. The drilling fluid of claim 1, wherein the non-toxic mineral base oil comprises 31 to 43wt % branched paraffin compounds having from 12 to 17 carbon atoms.

4. The drilling fluid of claim 3, wherein the non-toxic mineral base oil comprises 35 to 39wt % branched paraffin compounds having from 12 to 17 carbon atoms.

5. The drilling fluid of claim 1, wherein the non-toxic mineral base oil comprises 44 to 55 wt % cyclic paraffin compounds having 14 to 19 carbon atoms.

6. The drilling fluid of claim 5, wherein the non-toxic mineral base oil comprises 48 to 51 wt % cyclic paraffin compounds having 14 to 19 carbon atoms.

7. The drilling fluid of claim 1, wherein the non-toxic mineral base oil comprises 3% or less n-paraffins.

8. The drilling fluid of claim 1, wherein the non-toxic mineral base oil is characterized by one or more of the following properties: (i) a kinematic viscosity at 40° C. of between about 1 cSt and about 3 cSt; (ii) a flash point of at least 82.2° C. (180 ° F.); (iii) a pour point of less than about −40° C. (−40° F.); (iv) a cold flow viscosity at a temperature of 0° C. of less than about 7.0 cp; (v) an initial boiling point of greater than 200° C. and a final boiling point of greater than 300° C.; and (vi) wherein 90% of the mixture boils within the range of 200° C. and 310° C.

9. The drilling fluid of claim 1, wherein the base oil has a flash point of 82° C. or greater.

10. The drilling fluid of claim 9, wherein the base oil has a flash point of 87° C. or greater.

11. The drilling fluid of claim 1, wherein the base oil has a pour point of −40° C. or less.

12. The drilling fluid of claim 11, wherein the base oil has a pour point of −50° C. or less.

13. The drilling fluid of claim 11, wherein the base oil has a pour point of −60° C. or less.

14. The drilling fluid of claim 1, wherein the base oil has a cold flow at a temperature of 0° C. viscosity of less than about 9.0 cp.

15. The drilling fluid of claim 14, wherein the base oil has a cold flow viscosity at a temperature of 0° C. of less than about 6.5 cp.

16. The drilling fluid of claim 1, wherein the mixture has an initial boiling point of greater than 200° C. and an ending boiling point of greater than 300° C.

17. The drilling fluid of claim 1, wherein 90% of the mixture boils within the range of 220° C. and 310° C.

18. The drilling fluid of claim 1, wherein the mixture has a density of 0.82 g/cc or more.

19. The drilling fluid of claim 1, further comprising one or more additives selected from the group consisting of emulsifiers, wetting agents; organophilic clays; salts; filtration control agents; viscosifiers; weighting agents; fluid loss control agents; proppants and particulate agents.

20. The drilling fluid of claim 1, wherein the drilling fluid is an invert emulsion drilling fluid.

21. The drilling fluid of claim 1, wherein the drilling fluid comprises 0.01 wt % or less aromatic compounds.

* * * * *